(12) United States Patent
Holeman et al.

(10) Patent No.: US 9,358,863 B1
(45) Date of Patent: *Jun. 7, 2016

(54) PROTECTIVE COVER FOR VEHICLE FRONT ENDS

(71) Applicant: Novigo Designs, LLC, Nashville, TN (US)

(72) Inventors: Harold D. Holeman, Newark, DE (US); Andrew S. Holeman, Nashville, TN (US)

(73) Assignee: Novigo Designs, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,967

(22) Filed: Sep. 30, 2015

Related U.S. Application Data (63) Continuation of application No. 14/628,366, filed on Feb. 23, 2015, now Pat. No. 9,186,972.

(60) Provisional application No. 61/973,480, filed on Apr. 1, 2014.

(51) Int. Cl.
*B60J 11/06* (2006.01)

(52) U.S. Cl.
CPC ...................... *B60J 11/06* (2013.01)

(58) Field of Classification Search
CPC ........... B60J 11/00; B60J 11/06; B60R 19/44; B60R 19/52; B60R 19/54
USPC ......... 280/762, 770, 847, 848, 849, 850, 154; 150/154, 157, 166; 296/136.01, 296/136.02, 136.07, 136.08, 136.1, 136.12, 296/136.13
See application file for complete search history.

(56) References Cited

U.S. PATENT DOCUMENTS

| | | | | |
|---|---|---|---|---|
| 4,997,229 A | * | 3/1991 | Swanson | B60J 11/06 150/166 |
| 5,042,836 A | * | 8/1991 | Swanson | B62D 25/105 135/119 |
| 5,056,817 A | * | 10/1991 | Fuller | B60R 99/00 150/166 |
| 5,195,778 A | * | 3/1993 | Dismuke | B60R 11/06 150/166 |
| 5,944,347 A | * | 8/1999 | Pechman | B60R 13/005 150/166 |
| 6,415,832 B1 | * | 7/2002 | Ricks | B60J 11/00 150/166 |

FOREIGN PATENT DOCUMENTS

| | | | | |
|---|---|---|---|---|
| GB | 2451306 A | * | 1/2009 | B60J 11/06 |
| JP | 2008056220 A | * | 3/2008 | |

OTHER PUBLICATIONS

The Stretch Bra product brochure of C5 Creations, published 2010.

* cited by examiner

*Primary Examiner* — John Walters

(74) *Attorney, Agent, or Firm* — Panitch Schwarze Belisario & Nadel LLP

(57) ABSTRACT

A protective cover for a vehicle front end is formed of a stretch-recovery fabric of mesh construction with mesh openings across the entire or substantially the entire fabric. The mesh openings are large enough such that vehicle front end components covered by the protective cover remain visible to view through the protective cover. For example, the mesh openings may have opening width or diameter of about 0.25 to about 1 mm when the protective cover is in an unstretched condition. The protective cover includes one or more fasteners to engage mating fastener stud(s) on the vehicle. A stretch-recovery reinforcing material is joined to at least portion of the outer periphery of the protective cover.

9 Claims, 14 Drawing Sheets

PROTECTIVE COVER FOR VEHICLE FRONT ENDS

CROSS-REFERENCE TO RELATED APPLICATION

This application is a continuation application claiming priority to U.S. Ser. No. 14/628,366, filed Feb. 23, 2015, which issued as U.S. Pat. No. 9,186,972 on Nov. 17, 2015, and which claims priority to U.S. provisional application No. 61/973,480, filed Apr. 1, 2014, the contents of each of which are incorporated herein by reference.

BACKGROUND OF THE INVENTION

Performance automobiles are a sizeable investment. Appearance, protection and care of this investment are key concerns for owners. The exterior paint of these cars is subject to wear and damage even under normal operating conditions.

Current protective cover solutions are constructed from vinyl, leather or an applied protective film. Consumers and industry also refer to this type of product as a "car bra" or "bra". These solutions can be unattractive, expensive, bulky, difficult to install, hard to remove, poor fitting, allow moisture build-up, and can require permanent alteration to the vehicle from drilling or cutting. If not properly installed and maintained, many of the shortcomings of the current solutions can actually damage rather than protect the finish on the automobile.

Improvements to car bras and vehicle covers continue to be sought.

SUMMARY OF THE INVENTION

A protective cover for a vehicle front end is formed of a stretch-recovery fabric having a front face and an opposite face and having an outer periphery of a first length and width in an unstretched condition and a second length and width greater than the first length and width in a stretched condition. The fabric has a mesh construction with mesh openings across the entire or substantially the entire fabric. Preferably, when the protective cover is in the stretched condition, the mesh opening have opening width or diameter of from about 0.25 to about 1 mm. In its stretched condition, the protective cover has an air permeability to permit a volume of air flow therethrough sufficient for operating an engine of the vehicle onto which the protective cover is installed without forming separate venting passages or larger holes through the protective cover. At least one stretch-recovery reinforcing material is joined to at least a portion of the outer periphery, such as along at least a portion of the top of said outer periphery. The protective cover also has one or more fasteners adapted to engage mating fastener stud(s) on the vehicle. When the protective cover is installed over a vehicle front end, the mesh openings are large enough such that vehicle front end components covered by the protective cover remain visible to view through the protective cover.

In one embodiment, one or more straps are attached to the protective cover. The straps are adapted to engage the protective cover to mounting structure within the engine holding compartment of the vehicle.

In one embodiment, a second stretch-recovery reinforcing material is joined to the outer periphery of the protective cover along at least a portion of the bottom of said outer periphery.

The mesh stretch-fabric protective cover is semitransparent and can be easily installed and removed without permanent alterations to the vehicle front-end in a fraction of the time of prior solutions. The stretch fabric protective cover of the invention does a better job of protecting the part without risk of the cover itself doing damage to the part due to moisture buildup or chaffing.

The designs and materials of the protective cover allow for greater airflow to the engine while providing complete surface coverage, greater visibility of features such as lights and emblems, quicker drying, and greater adaptability to aftermarket body components than previous or currently available products.

The design of the protective cover is more attractive because of the semi-transparent nature of the material, and its ability to fit the contours of the car's front end/bumper. These features are just not possible with vinyl or leather that requires many seams to approximate the correct shape. Also because of the flexible nature of a stretch fabric versus the more rigid structure of vinyl or leather, the protective cover is easier for the customer to use, and more cost-effective to produce, inventory and ship.

DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF EMBODIMENTS

Figure 1:
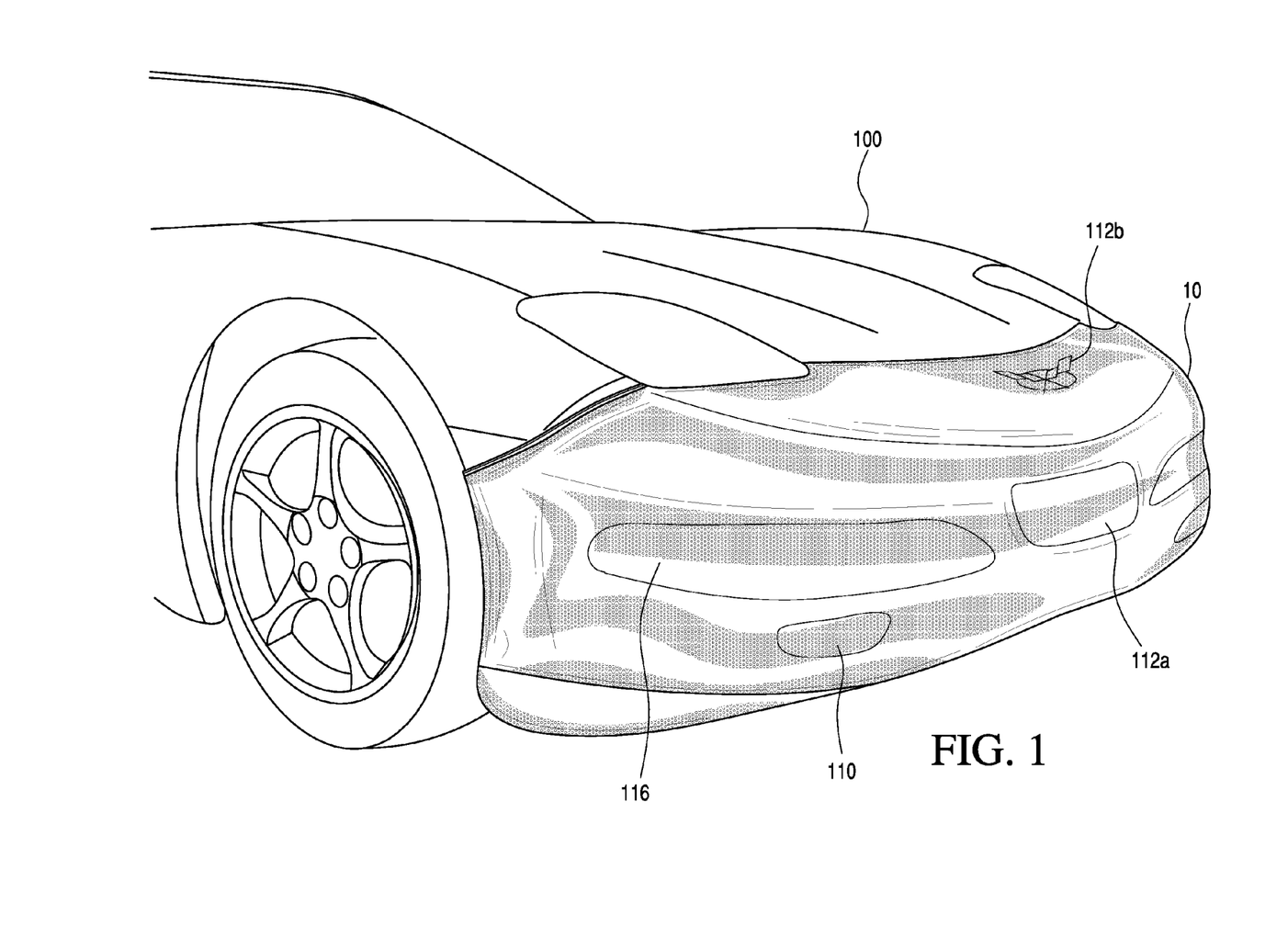
FIG. 1 is a left front perspective view of a protective cover for an automotive front end that is installed onto an automobile.
Figure 2:
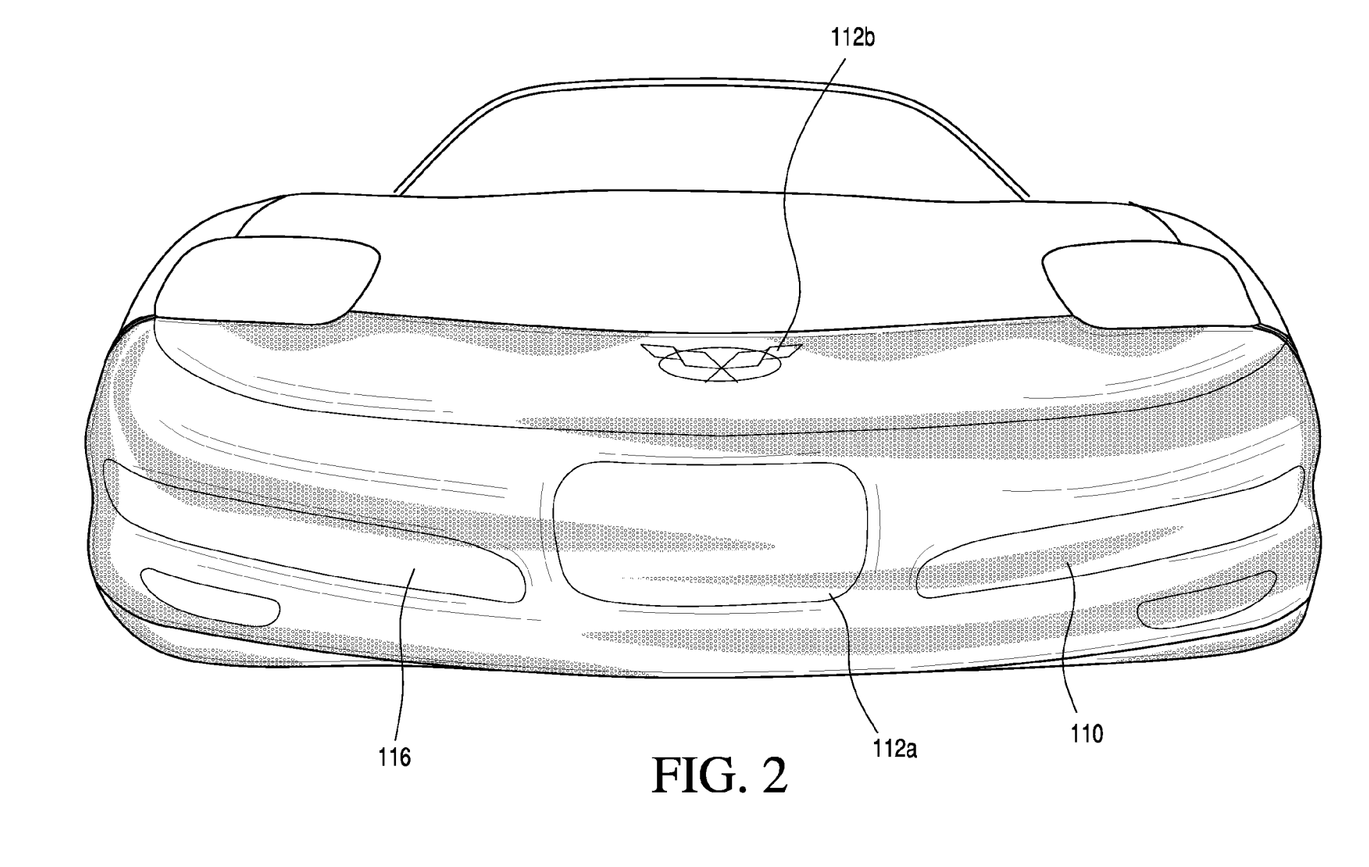
FIG. 2 is a front elevational view of the protective cover for an automotive front end of FIG. 1 as installed onto an automobile.
Figure 3:
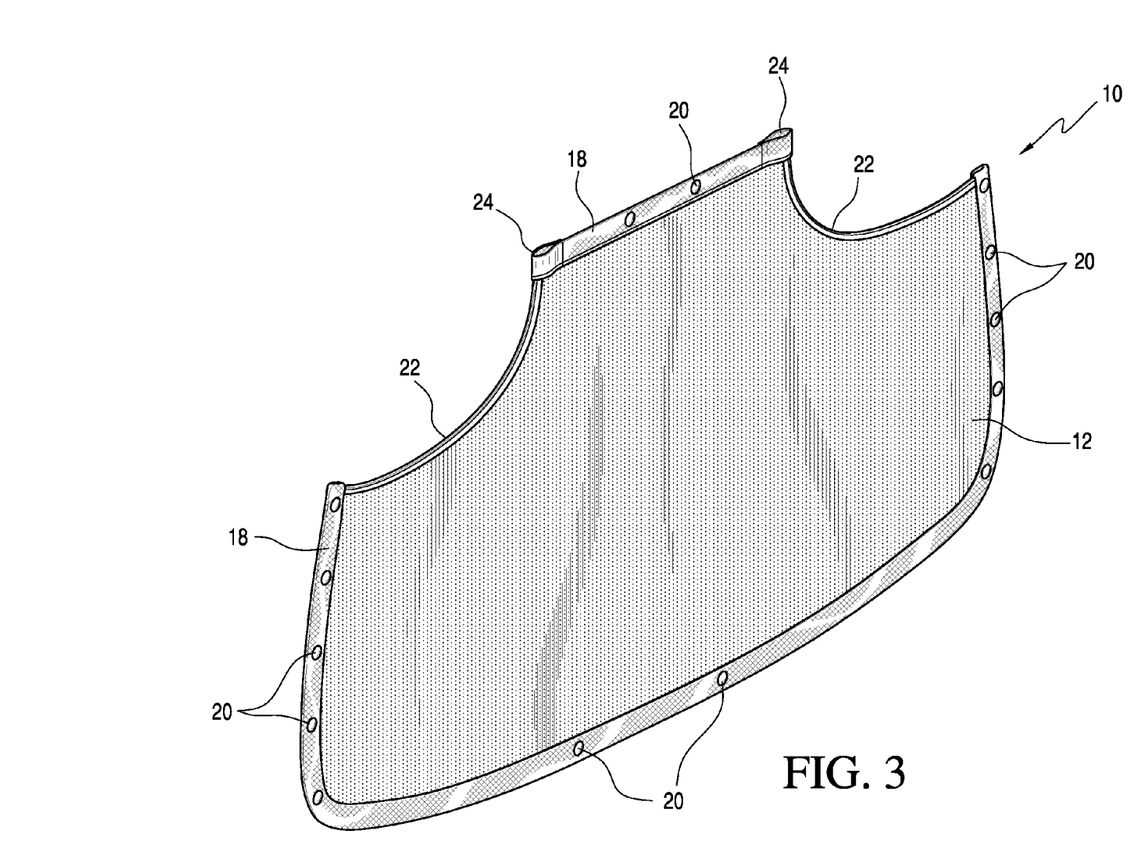
FIG. 3 is a left front perspective view of a first variant of a protective cover for an automotive front end.
Figure 4:
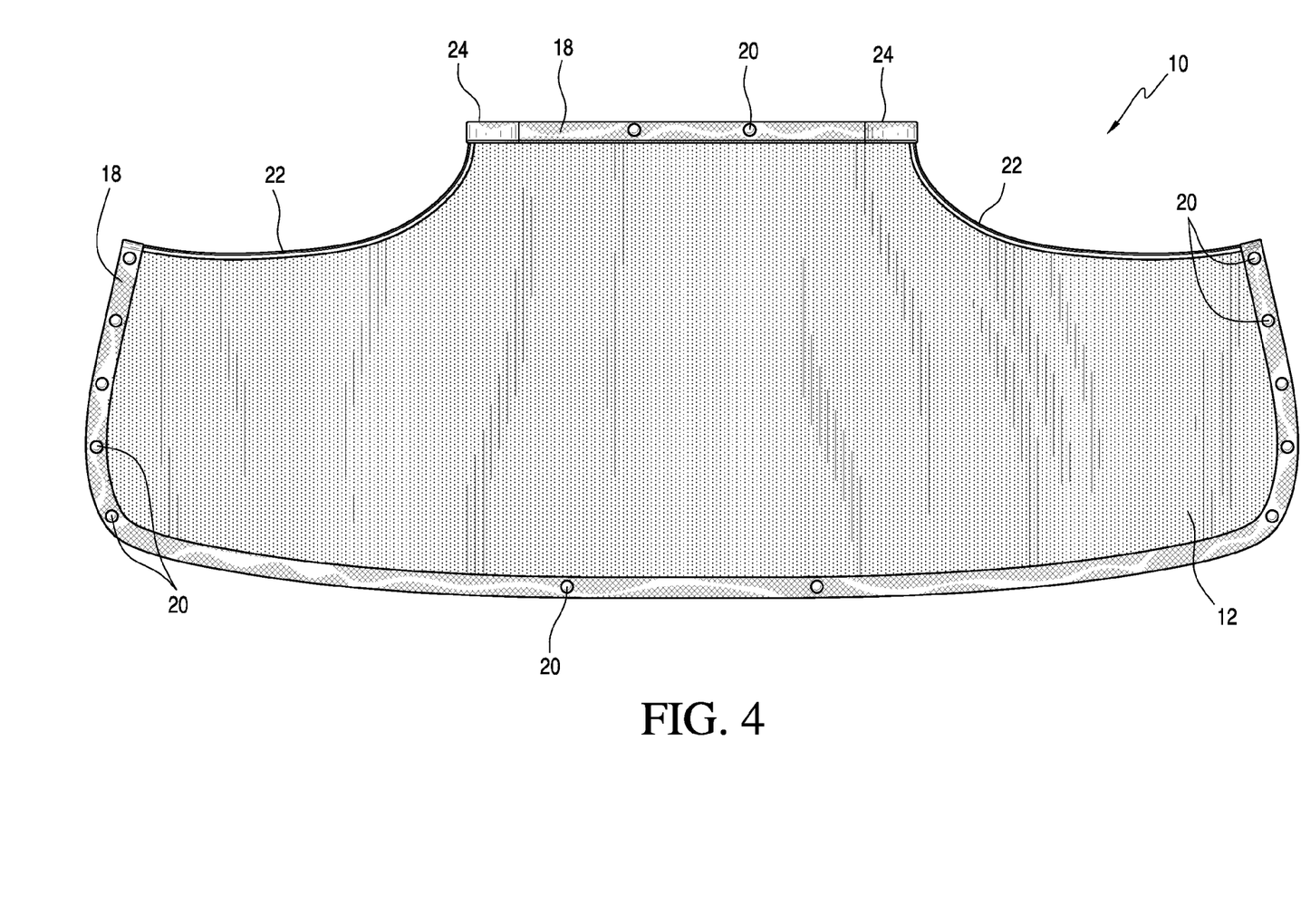
FIG. 4 is a front elevational view of the protective cover for automotive front end of FIG. 3.
Figure 5:
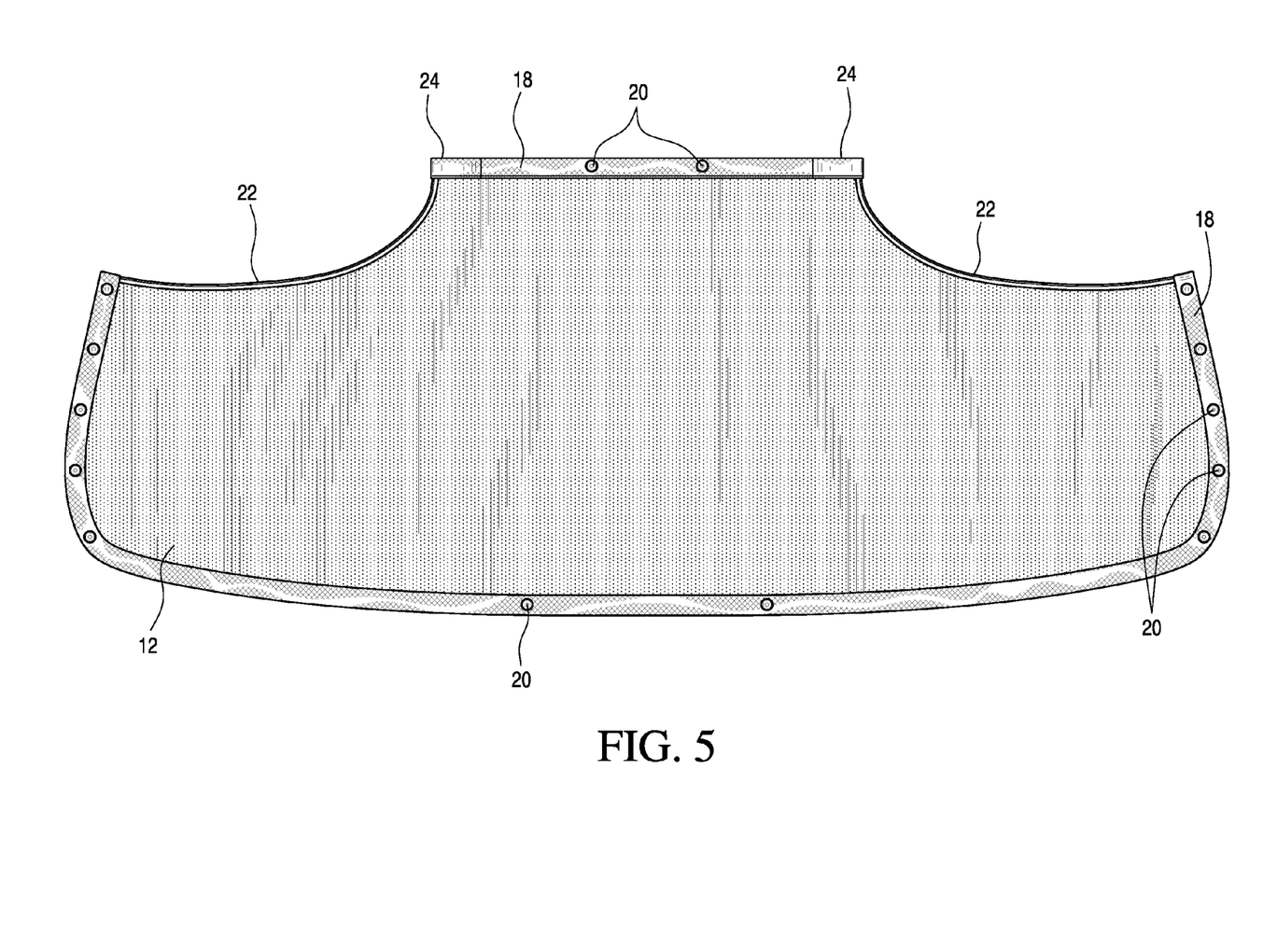
FIG. 5 is a rear elevational view of the protective cover for automotive front end of FIG. 3.
Figures 6, 7, 8, 9:
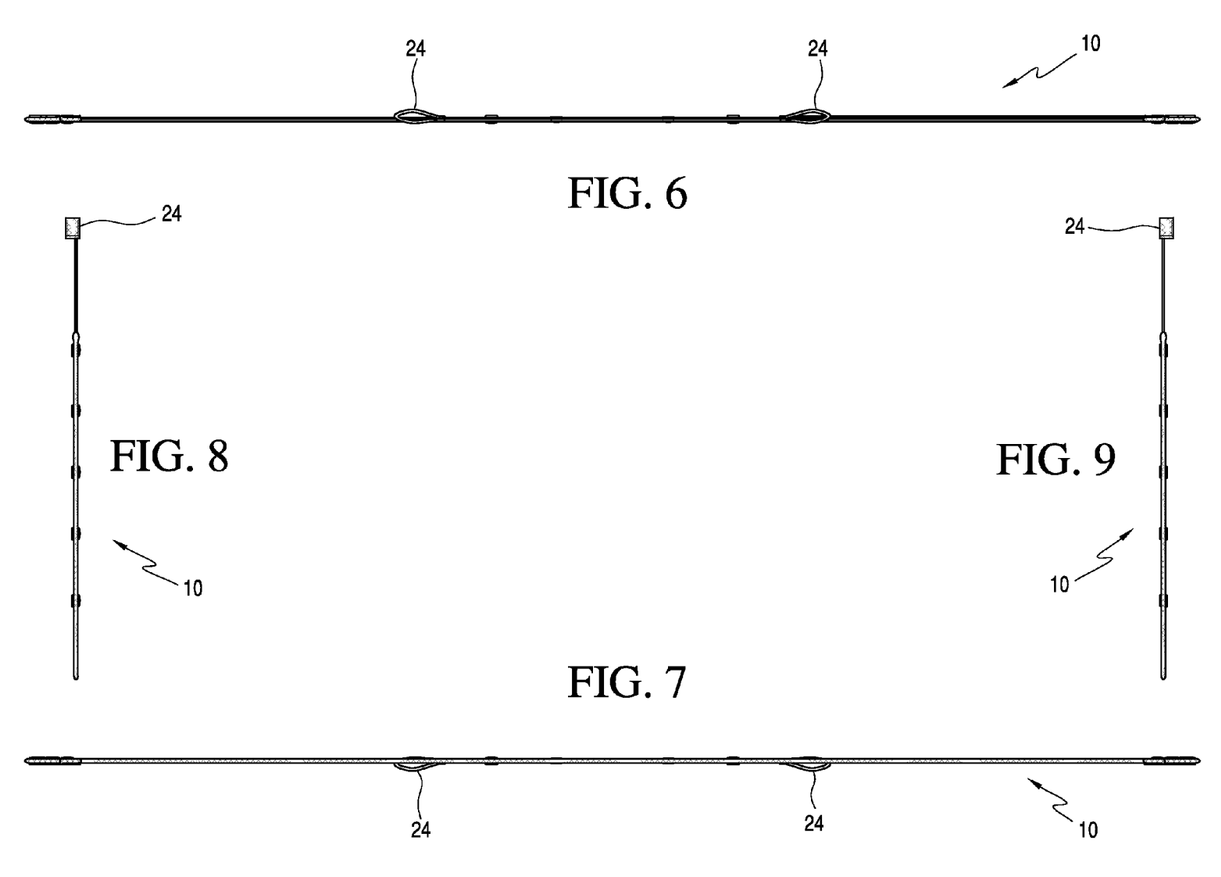
FIG. 6 is a top plan view of the protective cover for automotive front end of FIG. 3.
FIG. 7 is a bottom plan view of the protective cover for automotive front end of FIG. 3.
FIG. 8 is a left side elevational view of the protective cover for automotive front end of FIG. 3.
FIG. 9 is a right side elevational view of the protective cover for automotive front end of FIG. 3.

Referring to FIGS. 1 and 2, a protective cover 10 is installed over an automobile front end. The protective cover 10 is designed for vehicles, particularly for performance model automobiles. As one example, the protective cover 10 shown in FIGS. 1 and 2 is installed on a late model General Motors Corvette to protect the paint finish from road grime, bugs, bird droppings, tree sap, etc. The protective cover 10 may be installed over the bumper of other make/model cars.

Referring next to FIGS. 3 to 9, the protective cover 10 is constructed from a stretchable mesh fabric 12 such as a Nylon and Lycra fabric blend. Utilization of stretch fabric for fitted installation relies on the exact sizing of the cover and the "rebound" capability of the material to obtain a secure fit to the contours of the vehicle front-end.

The protective cover 10 is edged with elastic binding 18. The use of elastic to trim the edges complements the stretchable mesh fabric's element of stretch and recovery. A wide variety of elastic weight and sizes can be used to achieve this balance.

Snap-fasteners (buttons and sockets) 20 built into the protective cover are adapted to mate with snap-fastener screw stud components (supplied to replace OEM vehicle screws). The snap fasteners used to secure the protective cover to the vehicle can be selected from a variety of commercially available quick release fasteners.

Alternatively or in addition to the snap fasteners, elastic binding retaining straps 24 are provided to secure the protective cover to the vehicle front-end. The straps 24 are sewn at the top/corners of some protective covers for securing the protective cover inside of the vehicle engine compartment and providing a tight fit at final installation.

In one preferred embodiment, fabric and elastic binding components of the protective cover 10 are stitched/sewn with #69 synthetic, UV-resistant threads.

In a particularly preferred embodiment, the stretchable mesh fabric 12 is an 8 oz. weight mesh Spandex (76% nylon/24% Spandex blend), 4-Way Stretch, Matte finish fabric. Base pattern dimension for this preferred protective cover is approximately 72 inches×24 inches, but the dimensions may vary per specific vehicle application. Alternative stretch mesh fabrics and other fabric weights may be used.

A "mesh" is defined as a loosely woven or knitted fabric that has a large number of closely spaced holes. Generally, a mesh has a hole opening size of under 9 mm. When the hole openings are larger, the fabric is generally called netting rather than mesh. The filaments used to weave or knit the mesh can be coated before or after they are woven or knit into the mesh.

Figure 10:
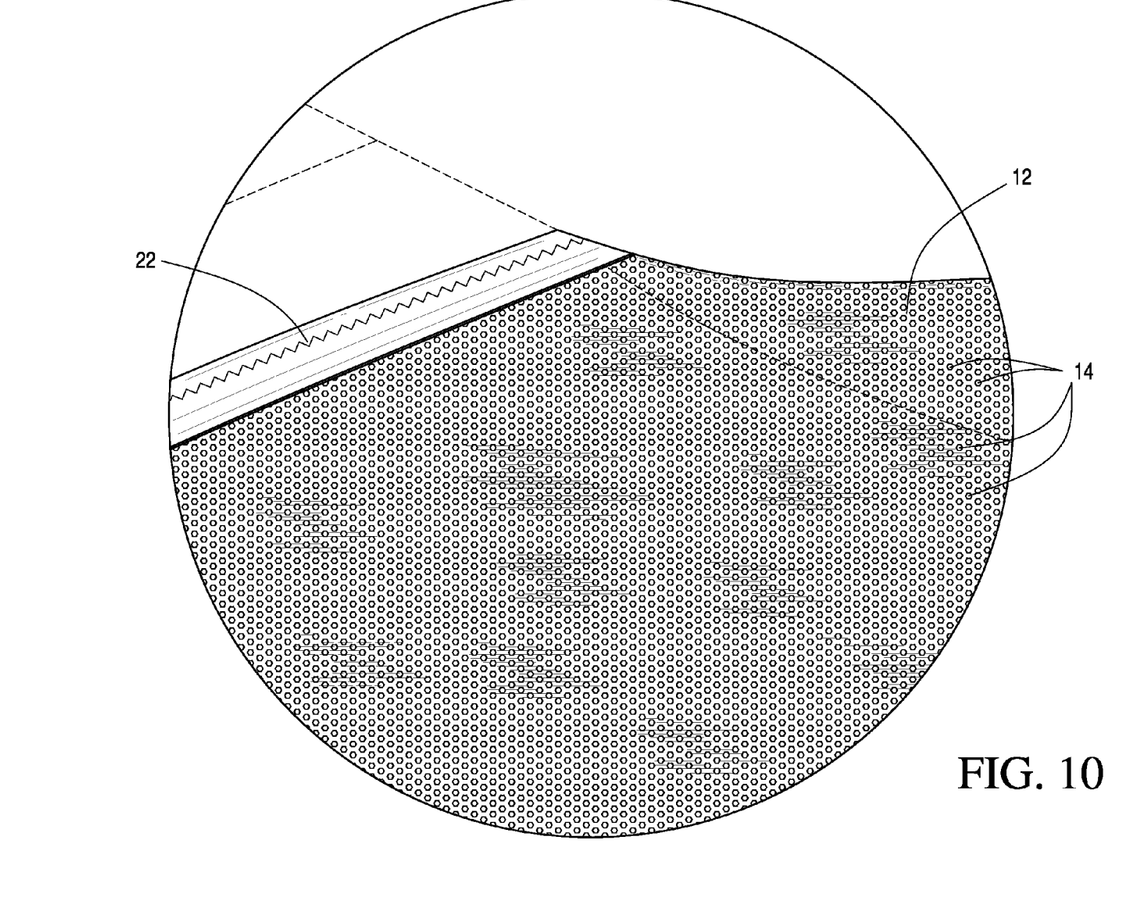
FIG. 10 is a magnified view of a portion of the protective cover for automotive front end of FIG. 1.

In one embodiment, the mesh fabric 12, 12b has perforations or holes 14, 16 approximately 0.25 to 1 mm in diameter when the fabric is in an unstretched or relaxed condition. In one preferred embodiment, the mesh fabric has perforations or holes about 0.5 mm in diameter when the fabric is in an unstretched or relaxed condition. As shown in FIG. 10, the mesh perforations or holes or openings 14 of the mesh fabric 12 may have a circular periphery configuration. However, the mesh openings or holes may have other shape configurations.

Figure 11:
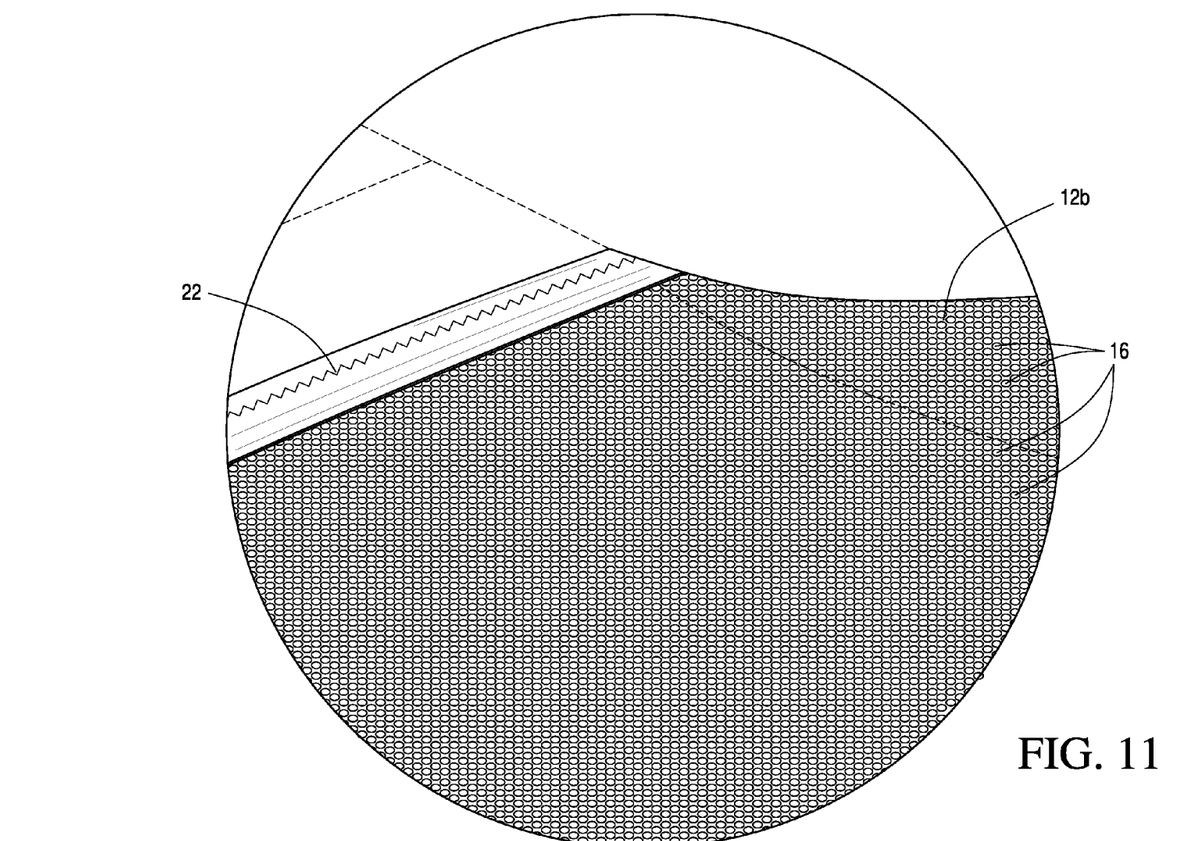
FIG. 11 is a magnified view of a portion of a variant of the protective cover for automotive front end.

Referring to FIG. 11, the mesh perforations or holes or openings 16 of the mesh fabric 12b have an oval periphery configuration.

Stretch mesh fabric allows for tight, contoured fit over the vehicle front-end and painted surfaces with great flexibility to accommodate accessories that may have been added to the automobile (i.e., ground effects, air dams, chin spoilers, etc). Durable, breathable stretch mesh fabric protects painted surfaces of the automobile from rocks, bugs and other related road debris, as well as moisture build up or chaffing without damaging clear-coat paint finish. The stretch mesh fabric has a multi-directional stretch and a "stretch and recovery" characteristic known as "rebound" that can expand around the front end/bumper of a vehicle and then provide tension via the recovery property to secure installation. In one embodiment, the mesh fabric is an 8 oz. weight mesh 76% nylon/24% spandex blend of nylon and Lycra spandex. However, the fabric can consist of different fiber blends and percentages to achieve the required "rebound". The choice of textile material (i.e., fabric) used in the fabrication of the product is one key variant. The selected fabric may be constructed of several different fibers (i.e., nylon, polyester, spandex, elastomers, etc.); the percentage blend of those fibers in the fabric is also a variant. The choice of which fabric determines how well the product will function over time. The difference can be measured in the expected service life of the product (i.e., months or years).

The protective cover is produced from a patterned shape that is dimensionally correct to fit the contours of the vehicle application on which it will be placed, e.g., automobile, truck, motorcycle . . . . The dimensional correctness is defined/dictated by the effort required to install the product balanced against the "holding power" of the product on to the front-end/bumper. The protective cover may be formed by transfer/cutting of the patterned shape to the fabric, finishing the raw edges and installing the required snap fastener/hardware.

In one preferred embodiment, the ends of the protective cover 10 are edged with 1½" heavy weight elastic (2-ply) edging 18 to allow for hardware integration as well as finished and durable edge.

In one preferred embodiment, top and bottom of the protective cover 10 are edged with 2½" fold-over elastic to create a 1¼" 2-ply to allow for hardware integration as well as finished and durable edge.

End to top "headlight" transition areas of the protective cover 10 are trimmed with ⅜" elastic trim 22 to ensure tight, contoured fit and finished edge.

A combination of snap fasteners 20 and/or elastic retaining straps or loops 24 built into the protective cover mate with hardware on the vehicle to secure the protective cover 10 or mask to the vehicle 100. The number of fasters and/or width of top elastic retaining straps or loops will vary depending upon specific vehicles onto which the protective cover will be installed. Stretch fabric, elastic edging, snap-fasteners and/or elastic retaining straps allow quick, easy installation and removal of the protective cover or mask with no permanent alteration to the vehicle.

Use of stretch, mesh fabric in the design allows for multiple, notable benefits not seen or experienced in currently available and marketed products and solutions, including: (1) Adequate airflow to cool the engine without requiring venting openings to be being cut into the product; (2) Single piece design additionally allows for greater coverage of the vehicle's front surfaces with a single piece design; (3) A semi-transparent surface allowing for greater visibility of vehicle features, such as indicator lights, vehicle emblems and badging, also without requiring openings to be cut in the product for this purpose; (4) Increased degree of stretch of stretch mesh fabric as compared to other synthetic fabrics, which creates greater ease in installation and adaptability to additional aftermarket components that may have been added to the vehicle (i.e., ground effects, etc.); (5) Enhanced wicking properties of the synthetic mesh to allow for the protective cover to dry, once wet, in a shorter duration than other materials; (6) Use of the lightweight fabric in the design allows for easy cleaning, maintenance and compact storage when not in use; and (7) The combination of single, base-piece material construction with minimal integrated hardware and edging components allows for increased production efficiency. The installed protective cover protects the vehicle surfaces from environmental elements and conditions such as road debris and bugs, and the tight fit prevents the cover from coming loose or damaging the vehicle's finish during use. In addition, the cover is easily removed for cleaning and or storage when not in use. The snap fasteners 20 and elastic loops or straps 24 mechanically secure the protective cover to the vehicle. These structures ensure the safety of the product's use in the event of a material failure or fabrication defect.

The protective cover 10 may be stored in a mesh Nylon and Lycra fabric blend 5½"×9" storage bag (not shown in the figures).

FIGS. 12 to 18 illustrate installation of the protective cover 10 to a vehicle 100 front end. The protective cover 10 is installed by "stretch-fitting" the cover over the front nose of the vehicle 100, such as an automobile. The snap fasteners 20 of the protective cover and/or the built-in straps or loops 24 easily anchor the cover securely to the automobile.

Figure 12:
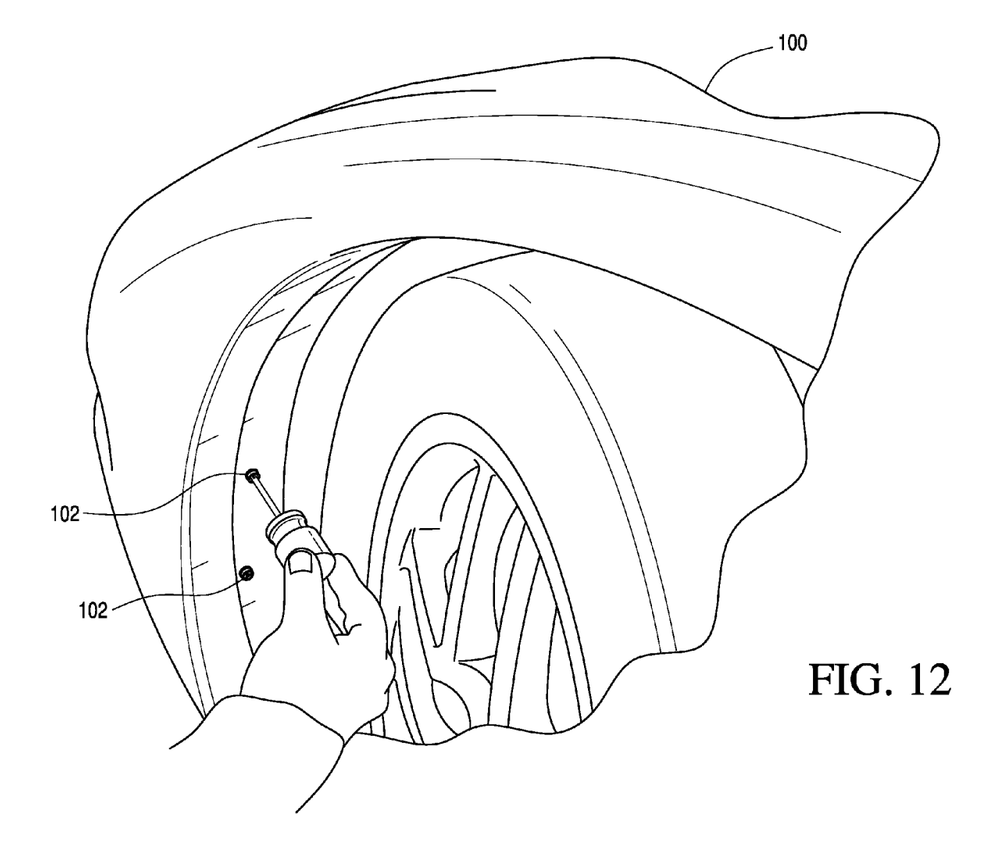
FIG. 12 is a right rear perspective view of a wheel well of an automobile illustrating installation of mounting hardware for the protective cover.
Figure 13:
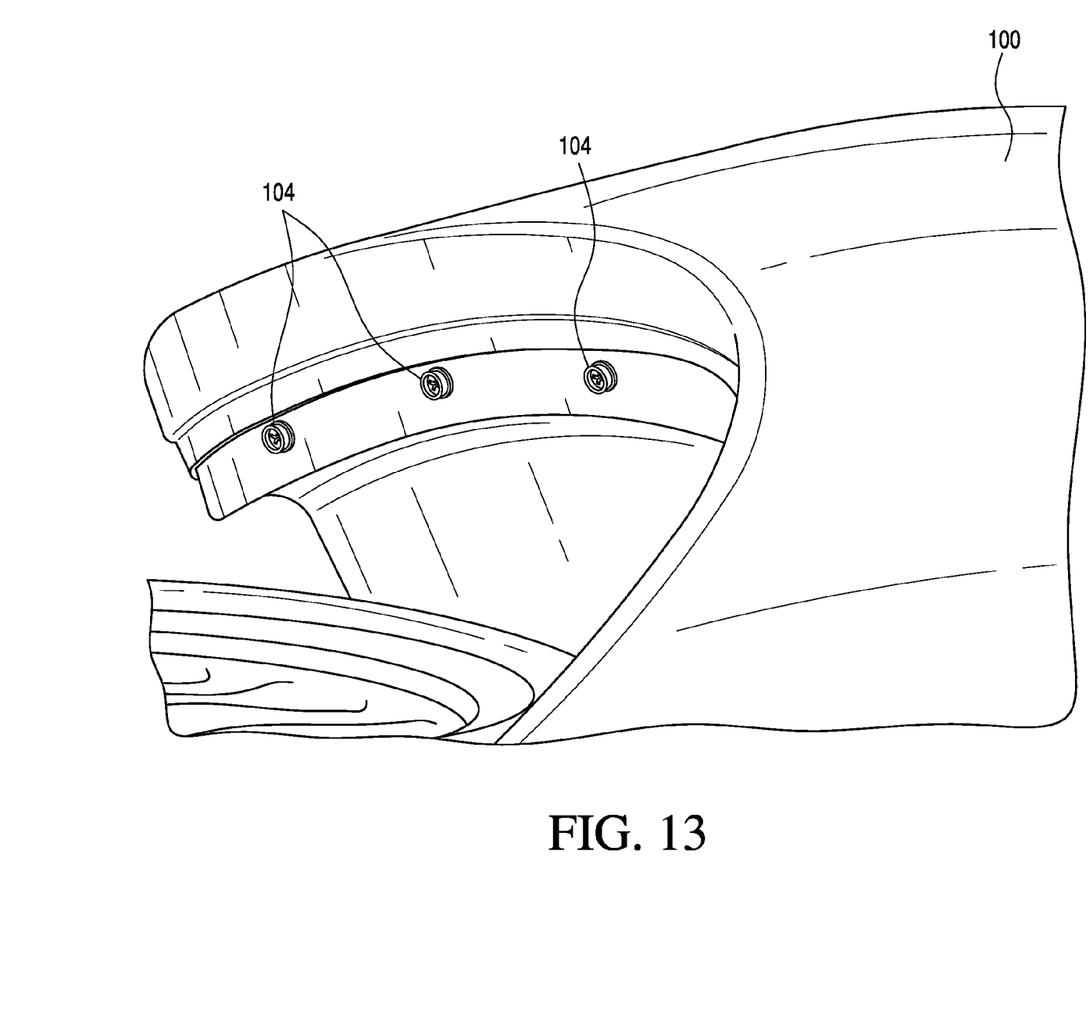
FIG. 13 is a right rear perspective view of the wheel well of the automobile shown in FIG. 12 with the mounting hardware for the protective cover installed.

Referring first to FIGS. 12 and 13, the vehicle is initially prepared to accept the protective cover by simply replacing existing body hardware 102 with the supplied snap head screw studs 104. FIG. 12 shows the existing body hardware 102 as it is removed and FIG. 13 shows the installed snap head screw studs 104.

Figure 14:
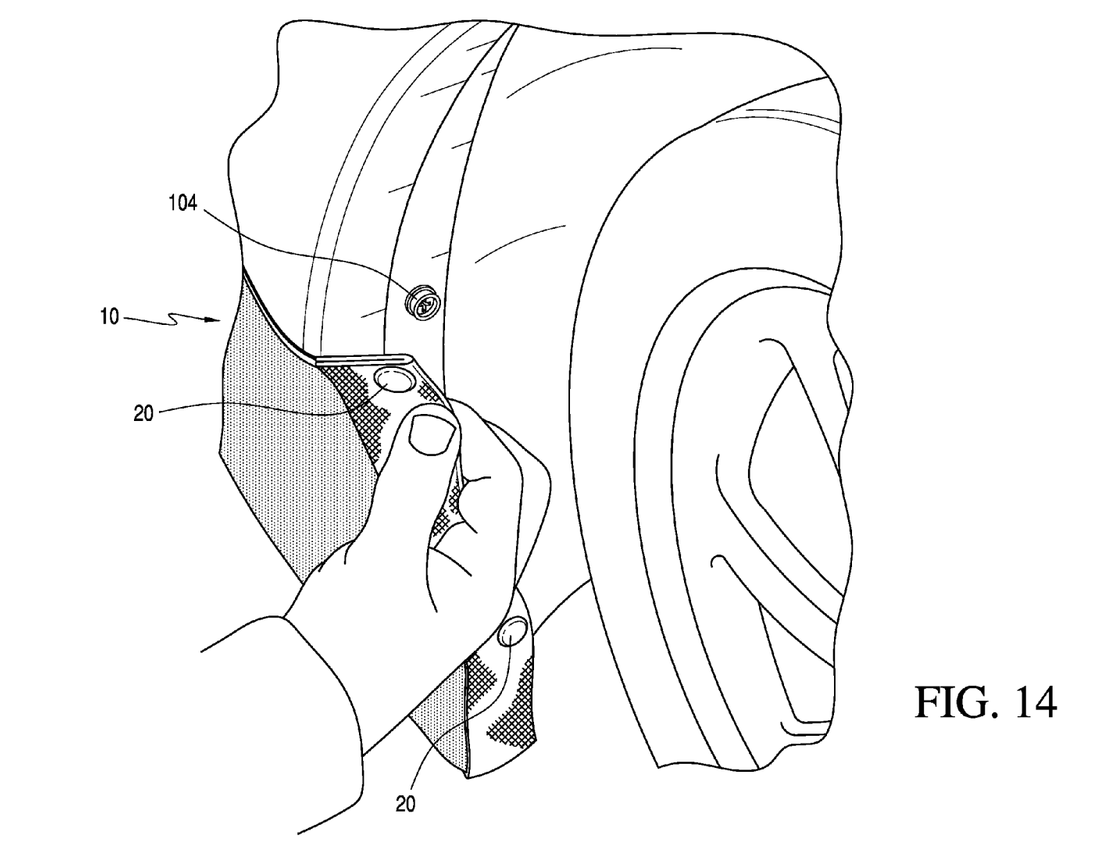
FIG. 14 is a right rear perspective view of the wheel well of the automobile showing a first step to install snaps of the protective cover onto mounting hardware on the wheel well.

Next, as shown in FIG. 14, the protective cover 10 is attached to the vehicle by engaging the snaps 20 on one side of the protective cover to the snap head screw studs 104.

Figure 15:
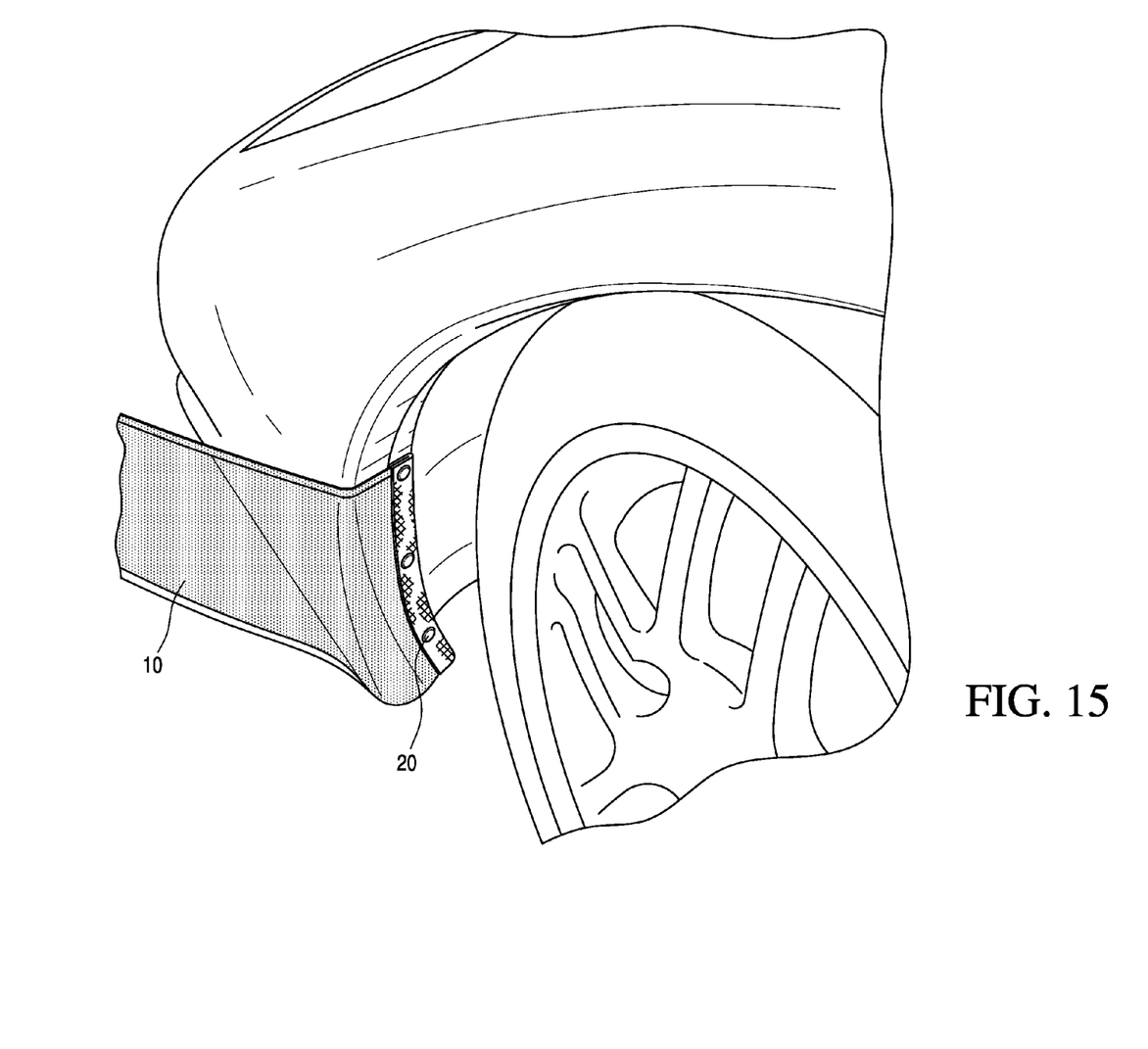
FIG. 15 is a right rear perspective view of the wheel well of the automobile showing the snaps from one side of the protective cover installed onto the mounting hardware of the wheel well.
Figure 16:
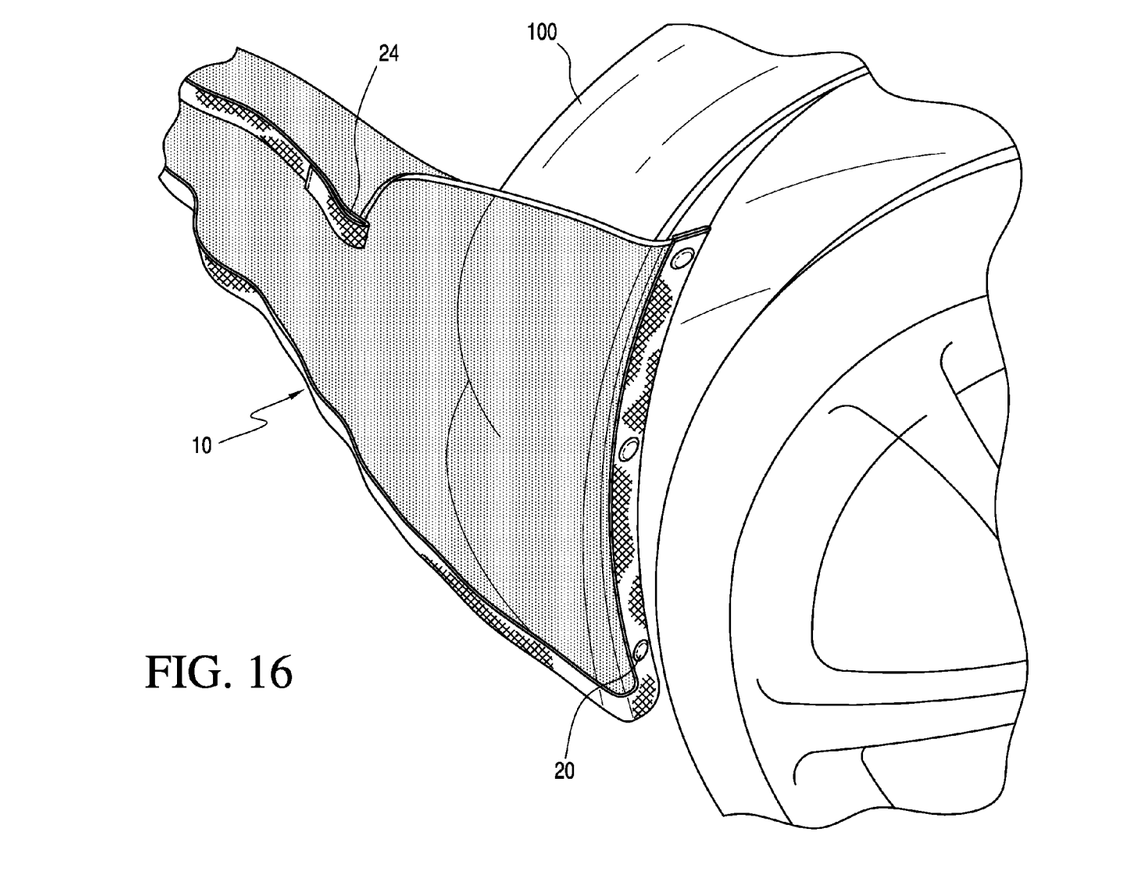
FIG. 16 is a right rear perspective view of the wheel well of the automobile showing stretching of the protective cover around a front end of the automobile.

Then, as shown in FIGS. 15 and 16, the protective cover 10 is stretched over the front end of the vehicle, such as the vehicle front bumper. The snaps of the other side of the protective cover are engaged to the snap head screw studs installed in the opposite wheel well of the vehicle.

Figure 17:
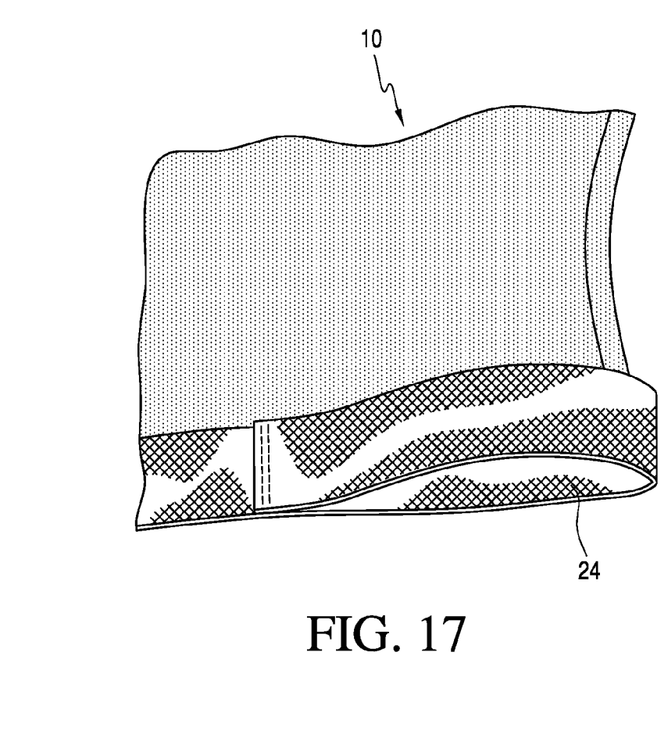
FIG. 17 is a magnified view of a loop fastener at a bottom edge of the protective cover.
Figure 18:
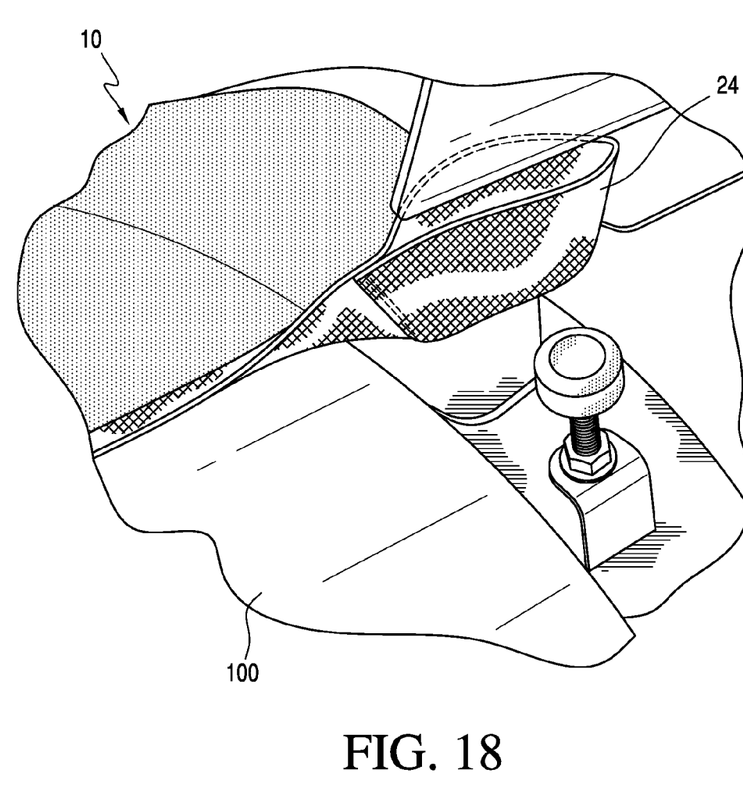
FIG. 18 is a perspective view showing the step of securing the loop fastener to hardware at the bottom of the automobile.

Finally, as shown in FIGS. 17 and 18, the corner elastic loops or straps 24 and/or snap fasteners 20 at the top of the protective cover, and the snaps 20 at the bottom of the cover are attached to vehicle hardware to secure the protective cover and complete the installation. At this point, the protective cover completely covers the bumper up to the hood opening. See FIGS. 1 and 2. To remove the protective cover, the process is reversed. This simple installation is one advantage of the protective cover of the invention.

As shown particularly in FIGS. 1 and 2, when the protective cover is installed onto a vehicle front end, the semi-transparent surface of the stretch mesh fabric forming the protective cover permits vehicle features, such as indicator lights 110, vehicle emblems 112b and badging 112a, and vent openings 116 to be seen without requiring openings to be cut in the product. The stretch mesh fabric also has sufficient permeability to permit air flow such that the protective cover may remain on the vehicle when the vehicle is driven.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A protective cover for a front end of a vehicle, comprising:
a stretch-recovery fabric having a front face and an opposite face and having an outer periphery of a first length and width in an unstretched condition and a second length and width greater than the first length and width in a stretched condition, said fabric having a mesh construction with mesh openings across the entire or substantially the entire fabric;
wherein in the unstretched condition the mesh openings have opening width or diameter of from about 0.25 to about 1 mm, and upon installation of the protective cover over a vehicle front end, the stretch-recovery fabric is in a stretched condition and the mesh openings are large enough such that vehicle front end components covered by the protective cover remain visible to view through the protective cover.

2. The protective cover of claim 1, further comprising at least one stretch-recovery reinforcing material joined to the outer periphery along at least a portion of the top of said outer periphery and along at least a portion of the bottom of said outer periphery.

3. The protective cover of claim 2, further comprising one or more fasteners on or in the protective cover adapted to engage mating hardware on the vehicle.

4. The protective cover of claim 3, wherein at least one of the one or more fasteners is on or in the stretch-recovering reinforcing material.

5. The protective cover of claim 3, wherein at least one of the one or more fasteners is at or near the outer periphery.

6. The protective cover of claim 1, further comprising one or more straps adapted to engage the protective cover to mounting structure within the engine holding compartment of the vehicle.

7. The protective cover of claim 1, wherein the protective cover in the stretched condition has an air permeability to permit a volume of air flow therethrough sufficient for operating an engine of the vehicle onto which the protective cover is installed without forming separate venting passages or larger holes through the protective cover.

8. The protective cover of claim 1, wherein the mesh openings are circular or oval.

9. The protective cover of claim 1, wherein the mesh fabric is a nylon and lycra blend.

\* \* \* \* \*